United States Patent
Mori

(10) Patent No.: US 8,208,744 B2
(45) Date of Patent: Jun. 26, 2012

(54) IMAGE PROCESSING APPARATUS CAPABLE OF ACCURATELY AND QUICKLY DETERMINING CHARACTER PART INCLUDED IN IMAGE

(75) Inventor: Toshihiro Mori, Neyagawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 804 days.

(21) Appl. No.: 11/447,103

(22) Filed: Jun. 6, 2006

(65) Prior Publication Data

US 2007/0172137 A1    Jul. 26, 2007

(30) Foreign Application Priority Data

Jan. 23, 2006 (JP) ................. 2006-013830

(51) Int. Cl.
*G06K 9/36* (2006.01)
(52) U.S. Cl. ....... 382/239; 382/176; 382/165; 382/170; 382/199; 382/282
(58) Field of Classification Search .......... 382/199, 382/195, 173; 358/462, 464–465
See application file for complete search history.

(56) References Cited

U.S. PATENT DOCUMENTS

| | | | |
|---|---|---|---|
| 4,503,556 A * | 3/1985 | Scherl et al. | 382/176 |
| 5,687,252 A * | 11/1997 | Kanno et al. | 382/176 |
| 5,867,159 A | 2/1999 | Hamada et al. | |
| 6,226,402 B1 | 5/2001 | Katsuyama | |
| 6,628,832 B2 | 9/2003 | Kanatsu | |
| 6,628,833 B1 * | 9/2003 | Horie | 382/173 |
| 6,721,071 B1 | 4/2004 | Maruyama | |
| 6,785,420 B2 | 8/2004 | Yamaai | |
| 6,798,906 B1 | 9/2004 | Kato | |
| 6,885,768 B2 | 4/2005 | Fujiwara | |
| 6,937,762 B2 | 8/2005 | Fujiwara | |
| 6,963,417 B1 | 11/2005 | Saito | |
| 2002/0003897 A1 * | 1/2002 | Tanaka | 382/165 |
| 2003/0118234 A1 | 6/2003 | Tanaka et al. | |
| 2004/0208368 A1 | 10/2004 | Yoshida | |
| 2005/0175239 A1 | 8/2005 | Araki et al. | |
| 2007/0165280 A1 | 7/2007 | Yago | |

FOREIGN PATENT DOCUMENTS

| | | |
|---|---|---|
| JP | 1-266689 | 10/1989 |
| JP | 3-41562 | 2/1991 |
| JP | 3-172984 | 7/1991 |
| JP | 4-158482 | 6/1992 |

(Continued)

OTHER PUBLICATIONS

K.Y. Wang, R.G. Casey, and F.M. Wahl, "Document Analysis System", IBM J. Res. Develop, vol. 26, pp. 647-656, 1982.*

(Continued)

*Primary Examiner* — Samir Ahmed
*Assistant Examiner* — Ruiping Li
(74) *Attorney, Agent, or Firm* — Morrison & Foerster LLP

(57) ABSTRACT

An image processing apparatus separates in a scanned image a text area from a graphic area primarily including a graphic form or a graph. For the text area, neighboring black pixels are connected to perform character determination in a unit of a rectangle obtained by connecting the black pixels. For the graphic area, labeling processing is used to extract a circumscribed rectangle of consecutive black pixels, without connecting the black pixels, to perform character determination in a unit of the circumscribed rectangle.

19 Claims, 8 Drawing Sheets

FOREIGN PATENT DOCUMENTS

| | | |
|---|---|---|
| JP | 5-282493 | 10/1993 |
| JP | 6-76103 | 3/1994 |
| JP | 06-187489 | 7/1994 |
| JP | 6-348891 | 12/1994 |
| JP | 7-168911 | 7/1995 |
| JP | 08-317197 | 11/1996 |
| JP | 9-223240 | 8/1997 |
| JP | 10-049688 A | 2/1998 |
| JP | 10-187878 A | 7/1998 |
| JP | 2000-222577 A | 8/2000 |
| JP | 2000-306102 A | 11/2000 |
| JP | 2001-34763 | 2/2001 |
| JP | 2001-60247 | 3/2001 |
| JP | 2001-147988 A | 5/2001 |
| JP | 2001-266068 | 9/2001 |
| JP | 2002-165105 | 6/2002 |
| JP | 2003-069843 | 3/2003 |
| JP | 2003-189096 | 7/2003 |
| JP | 2003-317107 A | 11/2003 |
| JP | 2004-246929 | 9/2004 |
| JP | 2004-304469 | 10/2004 |
| JP | 2005-316813 | 11/2005 |

OTHER PUBLICATIONS

Tan et al: "Text extraction using pyramid", Pattern Recognition, vol. 31, No. 1, pp. 63-72, 1998.*

Japanese Office Action mailed on Feb. 24, 2009 directed at counterpart application No. 2006-013830; 8 pages.

Japanese Notice of Grounds of Rejection, mailed Feb. 24, 2009, directed to related Japanese Patent Application No. 2006-009115; 8 pages.

Japanese Office Action mailed on May 19, 2009 directed at application No. 2006-013830; 8 pages.

Japanese Notice of Grounds of Rejection, mailed Sep. 1, 2009, directed to Japanese Patent Application No. 013830/2006; 5 pages.

Japanese Decision to Grant Patent, mailed May 26, 2009, directed to Japanese Patent Application No. 2006-009115; 6 pages.

* cited by examiner

IMAGE PROCESSING APPARATUS CAPABLE OF ACCURATELY AND QUICKLY DETERMINING CHARACTER PART INCLUDED IN IMAGE

This application is based on Japanese Patent Application No. 2006-013830 filed with the Japan Patent Office on Jan. 23, 2006, the entire content of which is hereby incorporated by reference.

BACKGROUND OF THE INVENTION

1. Field of the Invention

The present invention relates to an image processing apparatus, a character determination program product and a character determination method, and particularly, to an image processing apparatus, a character determination program product and a character determination method that determine a character part in a document.

2. Description of the Related Art

With the recent advance of computerization of information, there is a growing demand for archive or transmission of documentation in an electronic form rather than in a paper form. Thus, an increasing number of image processing apparatuses that obtain image data, such as multi function peripherals (MFP), are provided with a function of transmitting image data obtained by scanning as an attachment to an e-mail without printing out the image on a sheet of paper.

The images handled by the image processing apparatus, such as MFP, are now shifting from monochrome images to color images, so that the image data described above are now color image data in many cases. If an MFP scans and captures an A4-sized (297 mm by 210 mm) full-color document with a resolution of 300 dpi, the size of the color image data reaches about 25 MB. Thus, there is a problem that the color image data is too large to transmit as an attachment to an e-mail.

In order to solve the problem, typically, the image data captured by scanning (abbreviated as scan data, hereinafter) is reduced in size by compression for transmission. However, if the scan data is compressed with a uniform resolution for the whole image, the readability of characters in the image is compromised. Meanwhile, if the scan data is compressed with a high resolution enough to assure the readability of characters in the image, the size of the scan data cannot be reduced satisfactorily.

In order to solve the problem, the applicant has proposed, in Japanese Laid-Open Patent Publication No. 2004-304469, a compression method, such as a so-called compact PDF (portable document format) formatting, which compresses scan data with different resolutions for different areas in the image. In the compact PDF formatting, a PDF file is created as follows:

(1) A process of discriminating between areas in scan data is performed to separate a character part and a non-character part;

(2) Binarization is performed on the character part with a high resolution, characters of the same color are integrated to decide the color of the characters, and then the resultant character part is reversibly compressed by modified modified—read (MMR) compression or the like; and (3) The non-character part is irreversibly compressed by joint photographic experts group (JPEG) compression or the like with a reduced resolution.

FIG. 17 shows a specific example of a data configuration of a compact PDF file.

Referring to FIG. 17, the data configuration of the compact PDF file has a hierarchical structure. The first layer, corresponding to the uppermost layer, of the compact PDF file generally includes a file header on which a version of PDF used is described, a body on which the content of the document is described, a cross-reference table on which the positions of objects in the body are described, and a trailer on which the number of objects in the PDF file and the object numbers of catalog dictionaries are described.

The second layer beneath the first layer, corresponding to the body, includes document information including a date, a data block of each page (child page) constituting the document, a child page dictionary corresponding to the child page, a parent page dictionary on which the number of pages and the child page dictionary numbers are described, and a catalog dictionary on which the parent page dictionary number is described.

Further, as the third layer beneath the second layer, the data block of the child page includes one background layer storing JPEG compressed data therein, a plurality of character layers storing data having undergone MMR compression after binarization, and layer information on which the position of each layer, the character color and others are described.

The method of compressing scan data proposed in Japanese Laid-Open Patent Publication No. 2004-304469 can assure both the readability of characters and the size reduction.

In this method, which is performed as described above, it is important to accurately extract the character part from the scan data. For example, in a character recognition apparatus described in Japanese Laid-Open Patent Publication No. 06-187489 and in an image processing apparatus described in Japanese Laid-Open Patent Publication No. 08-317197, the character part is extracted from the scan data by conducting area discrimination processing. Specifically, black pixels are expanded and connected to each other, and the neighboring black pixel groups are collected together to form a rectangle in a unit of word or row (labeling), and then determination is made as to whether the relevant area is a text area or not.

As described above, in the area discrimination processing, connecting the black pixel groups to form a rectangle in a unit of word is effective when a document is formed mostly of a text area, in which case the accuracy of determination improves and the processing time is reduced.

In such processing, in the case where a document scanned includes a photograph, graphic pattern, and graph (collectively referred to as "graphics") as well as characters, as shown, e.g., in FIG. 18, the area including characters and characters added with ruled lines is extracted as a text area and subjected to MMR compression. On the other hand, the area including graphics is extracted as a background area and subjected to JPEG compression. They are stored in the PDF file format to create a compact PDF file.

In the area discrimination processing described above, however, the process of expanding and connecting the black pixels is carried out under a uniform condition regardless of the characteristics of the areas. Thus, in the case of the document including graphics such as a photograph, graphic pattern, graph or the like, the black pixels constituting characters in proximity to the graphics may be connected to the black pixels constituting the graphics, hindering determination of the relevant character area.

Further, if characters are included in the graphics, the black pixels constituting the characters may be connected to noise pixels in the proximity, again hindering determination of the relevant character area.

SUMMARY OF THE INVENTION

The present invention has been made in view of the above-described problems. An object of the present invention is to provide an image processing apparatus, a character determination program product and a character determination method that can accurately and quickly determine a character part included in an image even in the case where the image contains graphics such as photograph, graphic pattern or graph.

To achieve the above-described object, according to an aspect of the present invention, there is provided an image processing apparatus including: an image data obtaining unit for obtaining image data; a discrimination unit for discriminating between a text area and a graphic area for areas included in the image data; a first character determining unit performing character determination with a first character determination method on an area discriminated to be the text area by the discrimination unit; and a second character determining unit performing character determination with a second character determination method different from the first character determination method on an area discriminated to be the graphic area by the discrimination unit.

According to another aspect of the present invention, there is provided a character determination program product for causing a computer to perform character determination processing including: an image data obtaining step of obtaining image data; a discrimination step of discriminating between a text area and a graphic area for areas included in the image data; a first character determining step of performing character determination with a first character determination method on an area discriminated to be the text area in the discrimination step; and a second character determining step of performing character determination with a second character determination method different from the first character determination method on an area discriminated to be the graphic area in the discrimination step.

According to yet another aspect of the present invention, there is provided a character determination method for determining a character included in image data in an image processing apparatus, the method including: an image data obtaining step of obtaining image data; a discrimination step of discriminating between a text area and a graphic area for areas included in the image data; a first character determining step of performing character determination with a first character determination method on an area discriminated to be the text area in the discrimination step; and a second character determining step of performing character determination with a second character determination method different from the first character determination method on an area discriminated to be the graphic area in the discrimination step.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
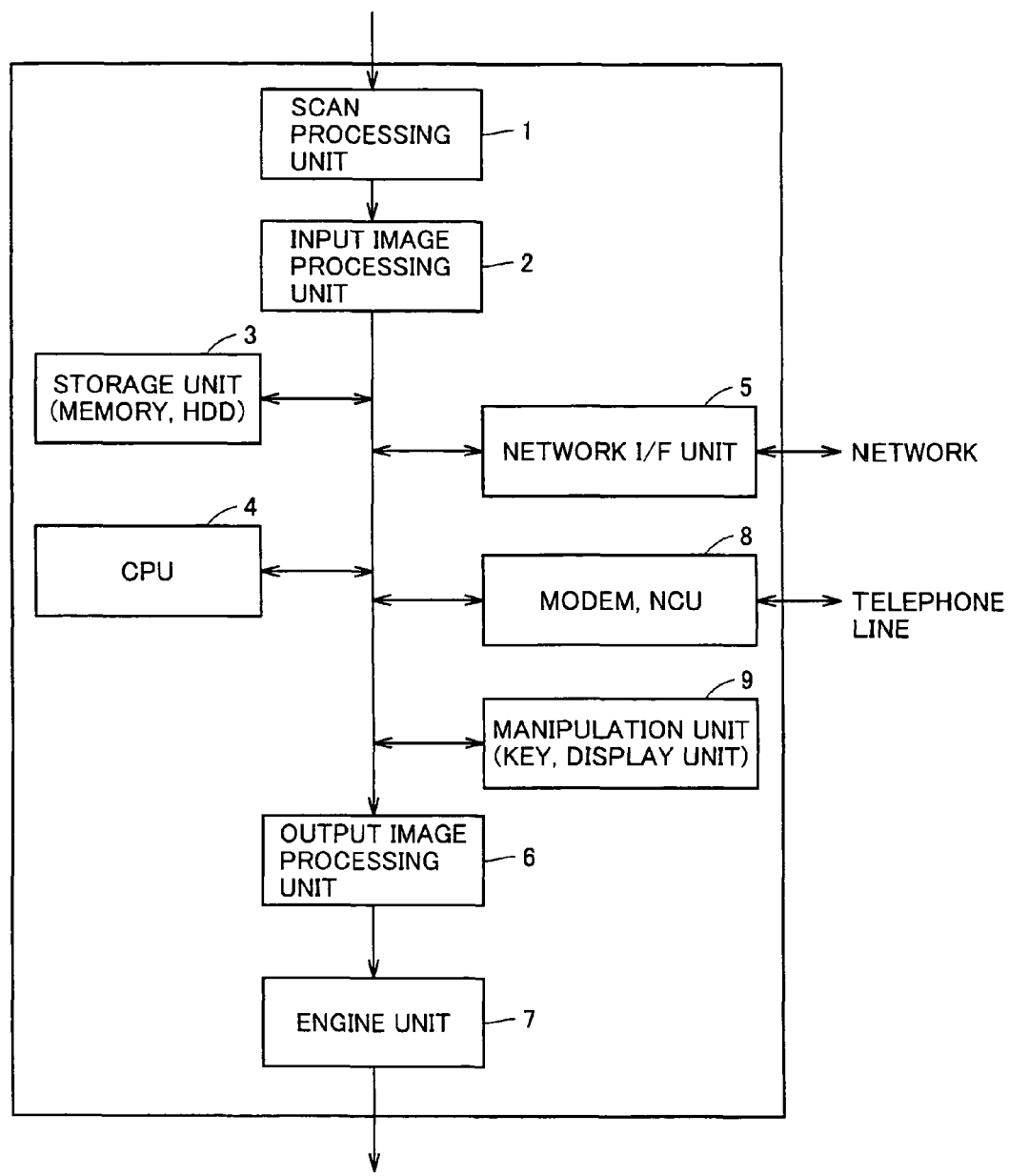
FIG. 1 is a diagram showing a specific example of a hardware configuration of an MFP 10.

In the following, an embodiment of the present invention will be described with reference to the drawings. In the following description, like components are denoted by like reference numerals and have like names and like functionalities.

This embodiment will be described supposing that an image processing apparatus according to the present invention is a multi function peripheral (MFP). However, the image processing apparatus according to the present invention is not limited to the MFP and may be any other apparatus that includes means of obtaining image data and means of processing the image data, such as an ordinary personal computer and a facsimile machine.

Referring to FIG. 1, the MFP 10 according to this embodiment includes a scan processing unit 1, an input image processing unit 2, a storage unit 3, a central processing unit (CPU) 4, a network interface (I/F) unit 5, an output image processing unit 6, an engine unit 7, a modem/network control unit (NCU) 8, and a manipulation unit 9.

The manipulation unit 9 includes a manipulation key and a display unit and serves as a user I/F, which accepts a user's manipulation, such as entry of a destination, selection of a scan condition, selection of an image file format, and start/halt of processing. The manipulation unit 9 outputs a manipulation signal base on the manipulation to the CPU 4.

The storage unit 3 includes an electronic memory, such as a dynamic random access memory (DRAM), and a magnetic memory, such as a hard disk, and stores a program and image data. The CPU 4 executes a program stored in the storage unit 3 and outputs a required control signal to each unit based on the manipulation signal input from the manipulation unit 9, thereby controlling the entire MFP 10. The storage unit 3 is used also as a work area for the CPU 4 to execute a program.

The scan processing unit 1 scans and reads a placed document in accordance with the control signal and outputs image data to the input image processing unit 2. In accordance with the control signal, the input image processing unit 2 performs, on the input image data, processing such as color conversion, color correction, resolution conversion, area discrimination or the like. The data processed is stored in the storage unit 3.

The output image processing unit 6 reads out the image data from the storage unit 3 in accordance with the control signal, performs screen control, smoothing, pulse wide modulation (PWM) control or the like on the image, and outputs the processed image data to the engine unit 7.

In accordance with the control signal, the engine unit 7 generates a toner image based on the image data input from the output image processing unit 6 and prints out the image by transferring the toner image onto a placed sheet of printing paper. In the case where the MFP 10 is a color MFP for outputting color images, the engine unit 7 generates the toner image using four colors of toner, yellow, magenta, cyan and black.

The CPU 4 executes the program stored in the storage unit 3, performs image processing on the image data stored in the storage unit 3 and sends output to the storage unit 3, the network I/F unit 5 or the modem/NCU 8.

The network I/F unit 5 is an I/F for transmitting an e-mail or the like to another device via a network, and performs protocol generation or the like. The network I/F unit 5 transmits the image data input from the CPU 4 or the image data read out from the storage unit 3 to another device via a network in accordance with the control signal.

The modem/NCU 8 performs modulation or demodulation for facsimile transmission/reception, generation of a facsimile communications protocol or the like to control communications via a telephone line. The modem/NCU 8 transmits the image data input from the CPU 4 or the image data read out from the storage unit 3 to another device via a telephone line in accordance with the control signal.

Figure 2:
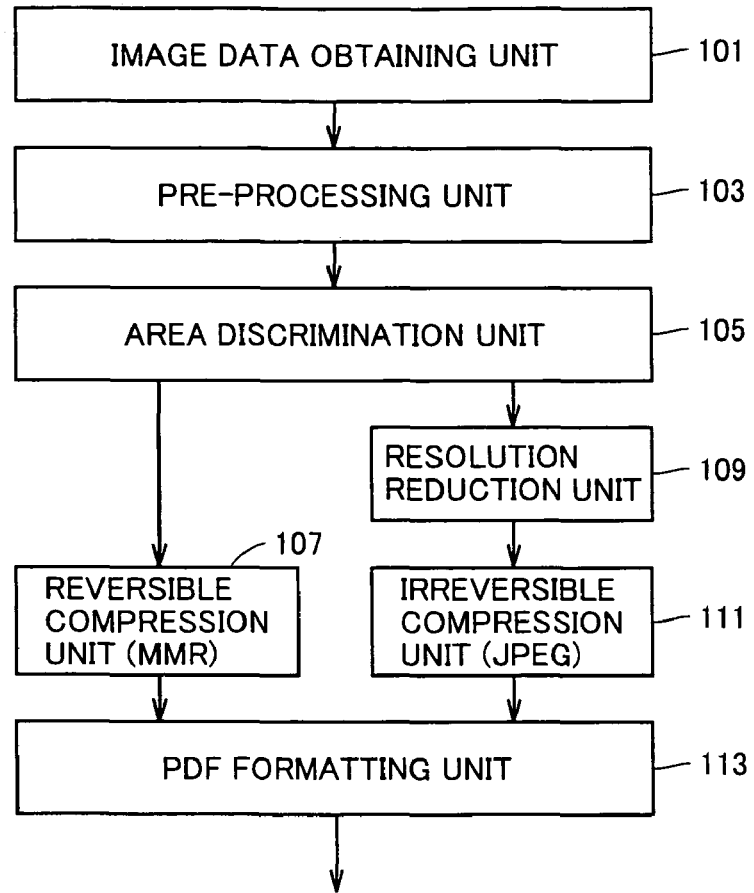
FIG. 2 is a block diagram showing a specific example of a functional configuration for creating a portable document format (PDF) file by compressing image data in the MFP 10.

Units shown in FIG. 2 are functions that are formed on the CPU 4 when the CPU 4 executes a program stored in the storage unit 3. Some of the functions may be formed on another hardware unit, such as the input image processing unit 2.

Referring to FIG. 2, in the MPF 10 according to this embodiment, a function for creating a portable document format (PDF) file includes an image data obtaining unit 101, a pre-processing unit 103, an area discrimination unit 105, a reversible compression unit 107, a resolution reduction unit 109, an irreversible compression unit 111, and a PDF formatting unit 113.

The image data obtaining unit 101 obtains image data generated in the scan processing unit 1 and inputs the image data in a data format, such as tagged image file format (TIFF), joint photographic experts group (JPEG) and bit map (BMP), to the pre-processing unit 103.

The pre-processing unit 103 performs, on the image data input from the image data obtaining unit 101, preprocessing for area discrimination, such as image format conversion, resolution conversion and under color removal, and inputs the pre-processed data to the area discrimination unit 105.

The area discrimination unit 105 performs area discrimination processing on the image data input from the pre-processing unit 103. The area discrimination processing may include character determination processing, processing of determining graphic, photograph or underlayer, dot removal processing, binarization processing, and character color decision processing. The area discrimination unit 105 carries out such area discrimination processing to extract a character part (including a character and a ruled line, or rule) in the image, to separate the character part from the background part including a photograph, a graphic pattern or a graph that is not a character. The character part herein also refers to the one included in a graphic, such as photograph, graphic pattern or graph, as will be described below.

The image data constituting the background part thus separated is input via the resolution reduction unit 109 to the irreversible compression unit 111, while the image data constituting the character part is input, not via the resolution reduction unit 109, but directly to the reversible compression unit 107.

The reversible compression unit 107 performs reversible compression, such as modified modified-read (MMR) compression, on the image data constituting the character part input from the area discrimination unit 105. On the other hand, the irreversible compression unit 111 performs irreversible compression, such as JPEG compression, on the image data constituting the background area reduced in resolution by the resolution reduction unit 109. The image data constituting the character part compressed by the reversible compression unit 107 and the image data constituting the background area compressed by the irreversible compression unit 111 are input to the PDF formatting unit 113, and the PDF formatting unit 113 creates a PDF file based on the input image date.

The functional configuration of the MFP 10 shown in FIG. 2 corresponds to the case where the image data constituting the background part is reduced in resolution prior to the irreversible compression when creating a PDF file. Alternatively, the image data constituting the background part may be subjected to irreversible compression without being reduced in resolution, in which case the MFP 10 does not need the function of the resolution reduction unit 109.

Figure 3:
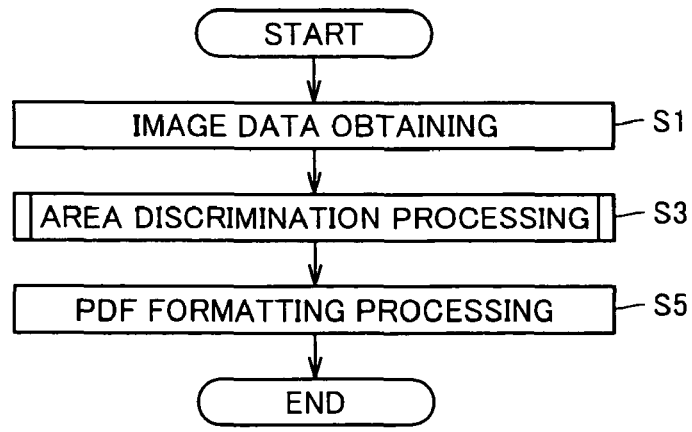
FIG. 3 is a flowchart showing a flow of processing of creating a PDF file by compressing image data in the MFP 10.

A process shown in the flowchart in FIG. 3 is implemented primarily by the CPU 4 executing a program stored in the storage unit 3 to control the units shown in FIG. 2. Specifically, referring to FIG. 3, in the MFP 10 according to this embodiment, the image data obtaining unit 101 first obtains image data (step S1). On the obtained image data, the pre-processing unit 103 performs pre-processing and then the area discrimination unit 105 performs area discrimination processing (step S3). For the image data, compression processing appropriate for the respective areas in accordance with the discrimination results is performed, which is followed by the PDF formatting in the PDF formatting unit 113 (step S5), and thus, the image data is compressed and the PDF file is created. More specifically, in step S5, for the image data constituting the area determined to be the character part in step S3, reversible compression processing as in the MMR compression is carried out in the reversible compression unit 107, without reduction of resolution. For the image data constituting the area determined to be the background part in step S3, in step S5, irreversible compression processing as in the JPEG compression is carried out in the irreversible compression unit 111 after the resolution is reduced in the resolution reduction unit 109. It is noted that, in step S5, the irreversible compression processing for the image data constituting the area determined to be the background part may be carried out without reducing the resolution.

For the PDF formatting processing in step S5, typical processing for creating a so-called compact PDF file as described above may be employed, which is not limited to any particular processing in the present invention. Hereinafter, the area discrimination processing performed in step S3, which is the distinguishing feature of the present invention, will be described in detail. Herein, explanation will be made assuming that the area discrimination processing is to be performed specifically on the document shown in FIG. 5.

Figure 4:
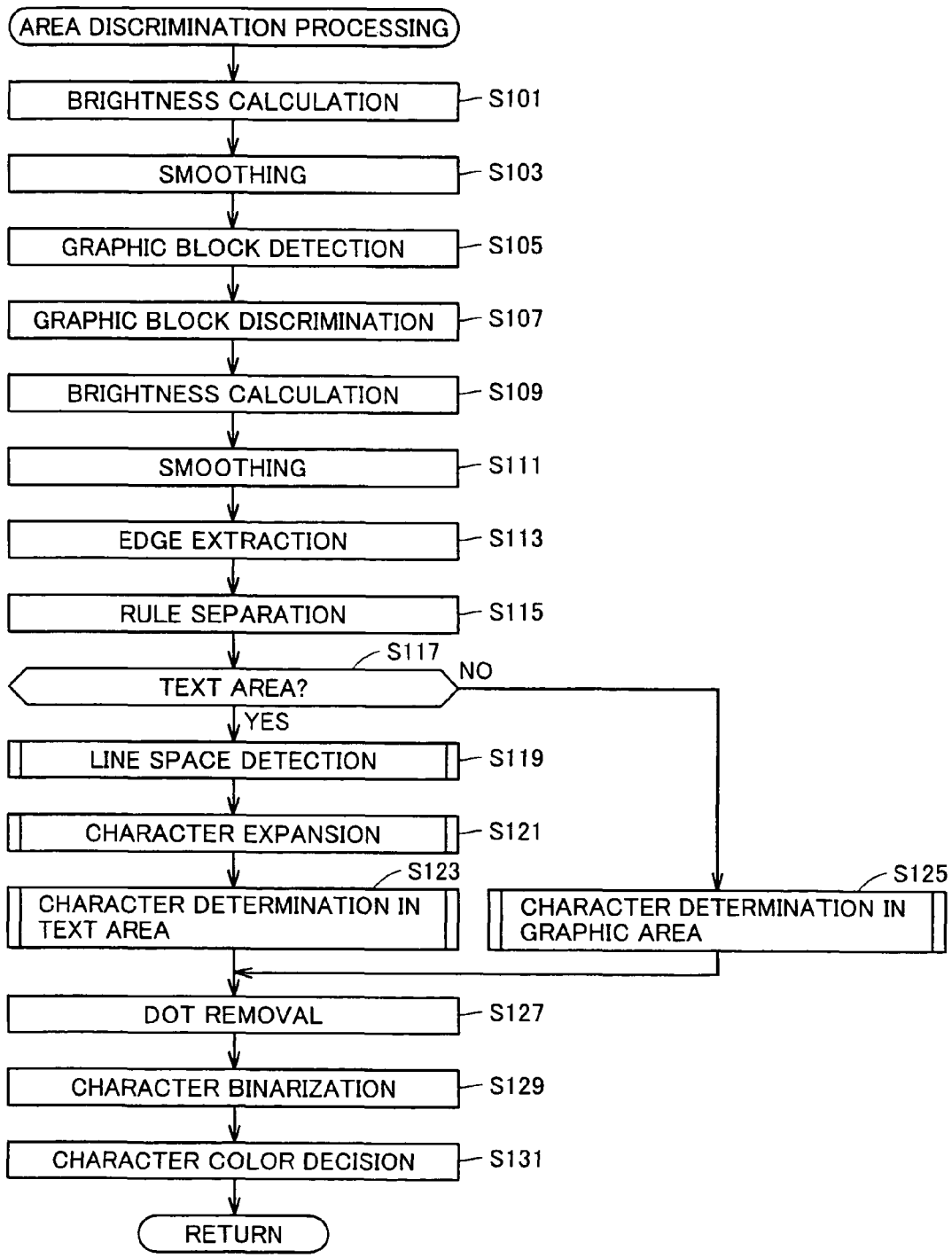
FIG. 4 is a flowchart showing a flow of area discrimination processing performed in step S3.

Referring to FIG. 4, firstly, in steps S101-S107, processing of discriminating the area primarily containing graphics such as photograph, graphic pattern, graph and the like (hereinafter, referred to as the "graphic area") in the document is carried out. More specifically, in step S101, brightness of the input image data as a whole is calculated to generate a brightness image. In this step, when the input image data is a 24-bit full-color image, a monochrome 8-bit brightness image is generated.

Then, in step S103, smoothing processing is performed on the generated brightness image. A noise is removed from the brightness image by the smoothing processing thus executed, and the precision of the following discrimination improves.

Next, in step S105, binarization processing and labeling processing are performed on the brightness image having undergone the smoothing processing. Of the brightness images having undergone the binarization and labeling processing, those of a prescribed size or greater (those exceeding the size of a typical character) are extracted as graphic blocks, which are the candidates for the graphic areas. Further, in step S107, the extracted blocks are classified in more detail in accordance with the characteristics of the images in the respective graphic blocks, and discrimination is made as to whether each of the graphic blocks corresponds to a small area of photograph, a small area of graphic pattern, a small area of graph, or a small area containing a character part, within a graphic area.

Next, in steps S109-S115, processing of discriminating the area formed of characters and character strings (hereinafter, referred to as the "text area") in the document is carried out. More specifically, in steps S109 and S111, brightness calculation processing and smoothing processing are carried out, which are similar to those performed in steps S101 and S103 above for discriminating the background area, and thus, the processing results obtained in steps S101 and S103 may be used without modification. However, it is preferable to differentiate the parameters for the brightness calculation processing and the smoothing processing (steps S109, S111) for discrimination of the text area from the parameters for the brightness calculation processing and the smoothing processing (steps S101, S103) for discrimination of the background area, to obtain optimal discrimination results in the respective areas.

Figure 5:
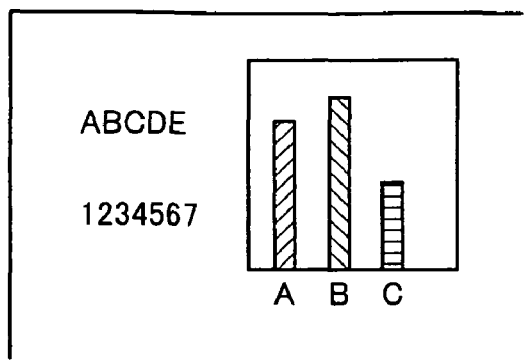
FIG. 5 shows a specific example of a document.
Figure 6:
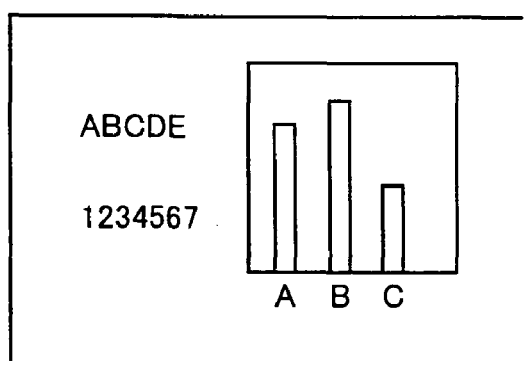
FIG. 6 shows a specific example of an edge image.

Next, in step S113, the edge is extracted from the image data having undergone the smoothing processing to generate an edge image. When the processing is performed on the document as specifically shown in FIG. 5, the edge image as shown in FIG. 6 is generated. Generating the edge image in this way facilitates detection of a character or reversed character in a highly bright area. Further, in step S115, the rule (i.e., ruled line) is extracted from the generated edge image. The technique for separating the rule from the edge image is not limited to a particular technique in the present invention, but any known technique may be employed therefor.

Figure 7:
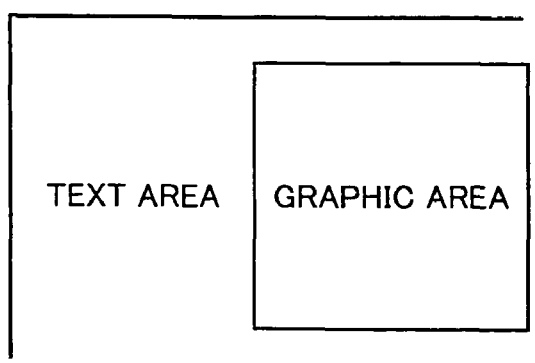
FIG. 7 shows a specific example of image data divided into a graphic area and a text area.

By the processing described above, the document as specifically shown in FIG. 5 is separated into the graphic area and the text area, as shown in FIG. 7.

Next, character determination processing is performed in steps S117-S125. More specifically, in step S117, determination is made as to whether the area to be determined is a graphic area or a text area, and the subsequent processing is branched based on the determined result. For the text area (YES in step S117), a line space, which is a non-character area, is detected and separated in step S119. The processing of detecting the line space herein refers to the processing of removing a line not including any characters, such as a wide line space, from the text area using a relatively moderate condition.

Figure 8:
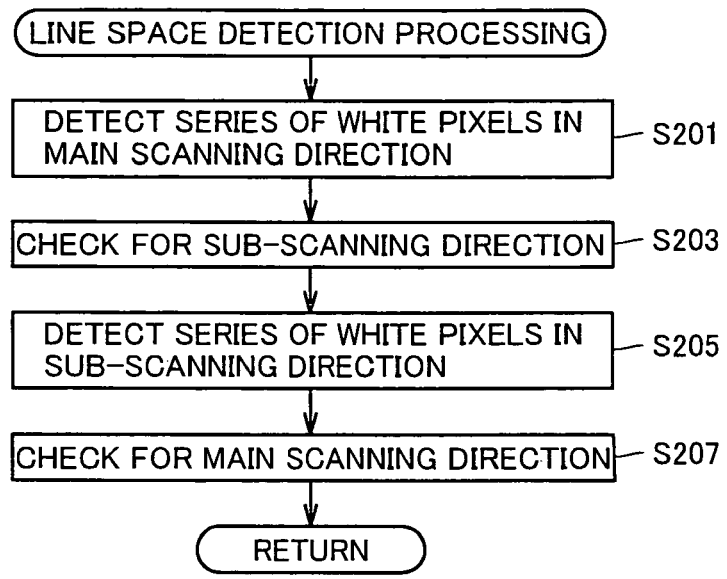
FIG. 8 is a flowchart showing line space detection processing performed in step S119.

Referring to FIG. 8, in step S119, firstly, the number of pixels of a specific color not constituting characters (herein, white pixels) that extend in series in a main scanning direction (x direction) within a target area is counted. When the series of white pixels of the number equal to or greater than a prescribed number are detected, the relevant white pixels are filled with a particular color (STOPPIXEL) (step S201). Although the pixels not constituting the characters are specifically assumed to be white pixels here, the color of the target pixels does not necessarily have to be restricted. For example, the target pixels may be those of the colors other than the color of the pixels constituting the characters.

Figure 9:
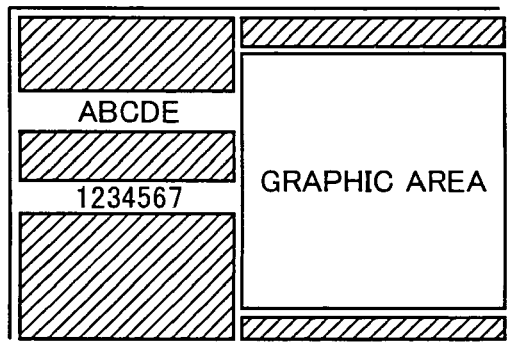
FIG. 9 shows a specific example of image data having the line spaces in the main scanning direction detected in the text area.

Next, the number of the pixels STOPPIXEL that extend in series in a sub-scanning direction (y direction) is counted, and if the number is less than a prescribed number, the color of the relevant pixel group is returned to white (step S203). The prescribed numbers above are determined in accordance with the resolution of the target area and the size of the characters to be detected. Specifically, it may be 150 dots or more in the main scanning direction, and 2 dots or more in the sub-scanning direction. By the processing so far executed, the line spaces in the main scanning direction are detected as shown in FIG. 9 when the target image is the document shown in FIG. 5.

Figure 10:
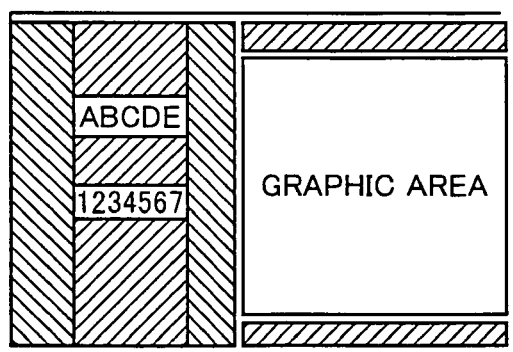
FIG. 10 shows a specific example of image data having the line spaces in the sub-scanning direction detected in the text area.

For the sub-scanning direction, similarly, a series of white pixels of a prescribed number or greater are detected (step S205), and for the relevant white pixels, the number of consecutive pixels in the main scanning direction is checked (step S207). The prescribed numbers are also determined similarly, which may be 2 dots or more in the main scanning direction and 150 dots or more in the sub-scanning direction. With the processing so far executed, when the target image is the document shown in FIG. 5, the line spaces in the sub-scanning direction are detected as shown in FIG. 10.

Next, in step S121, pixels of a particular color constituting the characters (black pixels in this example) are expanded to connect the neighboring pixels with each other. Although the pixels constituting the characters are assumed to be black pixels here, the color of the target pixels does not necessarily have to be restricted. For example, the target pixels may be those of the color other than the colors of the pixels constituting the background.

Figure 11:
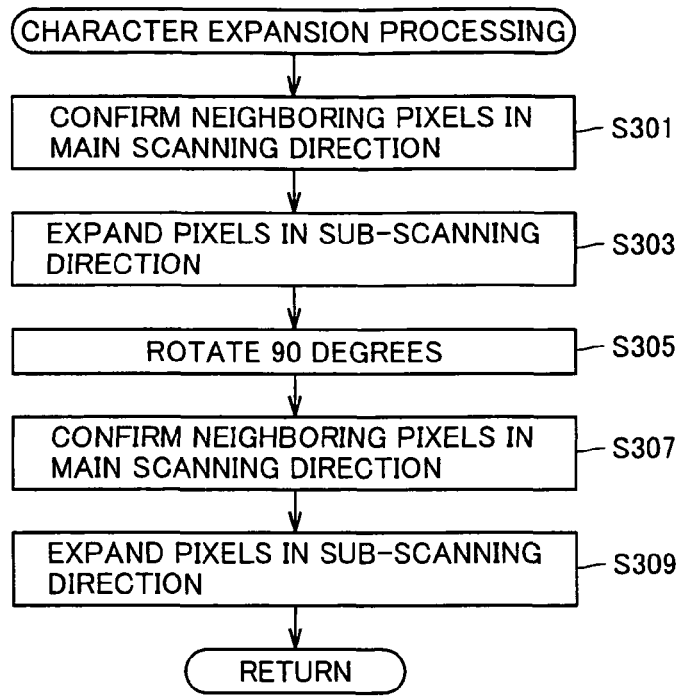
FIG. 11 is a flowchart showing character expansion processing performed in step S121.

Referring to FIG. 11, firstly, as the neighboring pixels, black pixels adjacent to each other at a distance equal to or less than a prescribed distance in the main scanning direction in the target area are detected (step S301). More specifically, the image is scanned in the main scanning direction (x direction), and for a certain x coordinate, a black pixel is searched for in the range of maximum lateral width of character (e.g., 190 pixels)/2 from the x coordinate position. The array value at the y coordinate where the black pixel was detected is set to "1". Search for the black pixel is repeated in the y direction sequentially from the position with the y coordinate of "0" to the coordinate value corresponding to the height of the image from which "1" is subtracted. If STOPPIXEL (line space) is detected during the search, no further search in the y direction is performed. Further, the array generated for the certain x coordinate is scanned, and if the number of series of array values "0" is equal to or less than a prescribed number, the array values of the relevant series are rewritten to "1". It is noted that, although the method of determining whether the interval between the neighboring pixels is equal to or less than a prescribed distance is shown as the method for detecting the neighboring pixels in step S121 in the specific example above, the neighboring pixels may be detected using any other method.

Next, the black pixel is expanded in the sub-scanning direction (y direction) (step S303). More specifically, the image is scanned in the main scanning direction (x direction), and for a certain x coordinate, it is scanned in the y direction to search for a black pixel. Then, if the array generated for the certain x coordinate in the range of maximum longitudinal width of character (e.g., 190 pixels)/2 from the detected black pixel has the array values of "1", the white pixels within the relevant range are filled with black.

Figure 12:
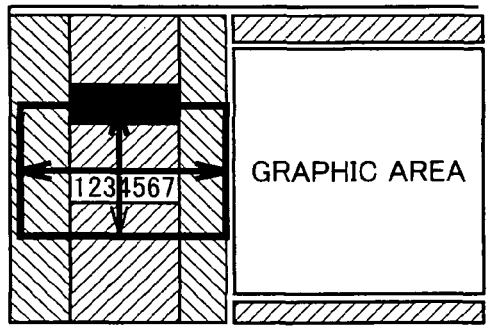
FIG. 12 shows a specific example of image data having the black pixels connected together in the text area.

Next, the target area is rotated 90 degrees (step S305) and, in a similar manner, the black pixels adjacent to each other at a distance equal to or less than a prescribed distance are detected in the main scanning direction (step S307), and the detected black pixels are expanded in the sub-scanning direction (step S309). When the document shown in FIG. 5 is subjected to such processing, the black pixels in the proximity, except for the line spaces, are connected together, as shown in FIG. 12.

Figure 13:
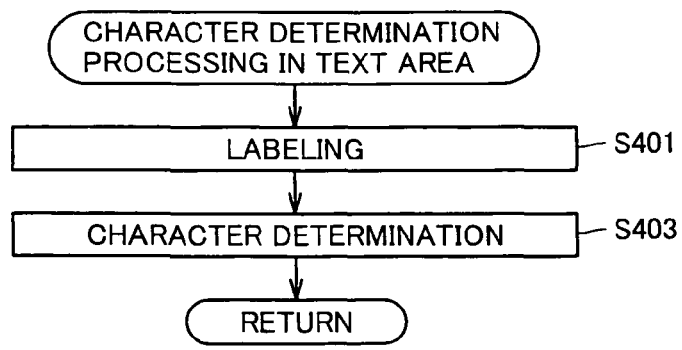
FIG. 13 is a flowchart showing character determination processing in the text area performed in step S123.
Figure 14:
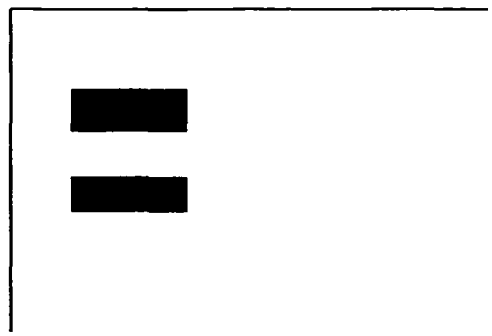
FIG. 14 shows a specific example of image data having the minimum rectangles surrounding the characters obtained by labeling.

Next, in step S123, character determination processing is carried out in the text area. Referring to FIG. 13, firstly, labeling is performed to obtain a minimum rectangular area surrounding a group of black pixels connected in the above processing, and the coordinate value of the minimum rectangle surrounding the characters connected and obtained by the labeling is obtained (step S401). For the labeling, a common method is used, which is not restricted to any particular method in the present invention. When the document shown in FIG. 5 is subjected to the processing, rectangles of connected black pixels as shown in FIG. 14 are obtained, which are subjected to the following processing.

For each rectangular area obtained by labeling above, character determination is carried out to determine whether the rectangular area is a character part or not, based on the conditions such as the length of the shorter side, the ratio between the shorter side and the longer side, the proportion of the black pixels in the rectangular area or the like (step S403).

For the graphic area (NO in step S117), the processing in the above-described steps S119 and S121 are skipped, and character determination processing is carried out in step S125 to determine the characters in the graphic area.

Figure 15:
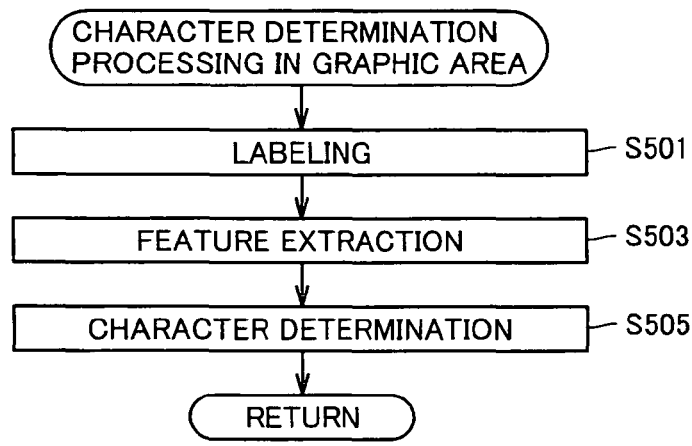
FIG. 15 is a flowchart showing character determination processing in the graphic area performed in step S125.

Referring to FIG. 15, firstly, as in the case of the character determination processing in the text area, labeling is performed in a common method to obtain a minimum rectangular area surrounding a group of consecutive black pixels (step S501).

Figure 16:
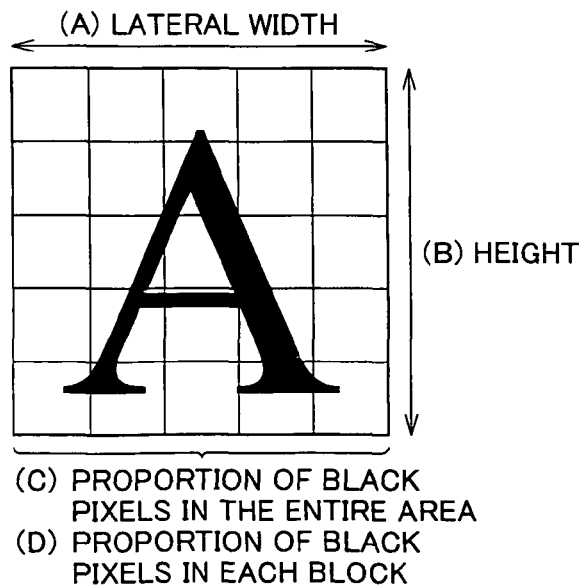
FIG. 16 shows a specific example of a block for performing character determination in the graphic area.
Figure 17:
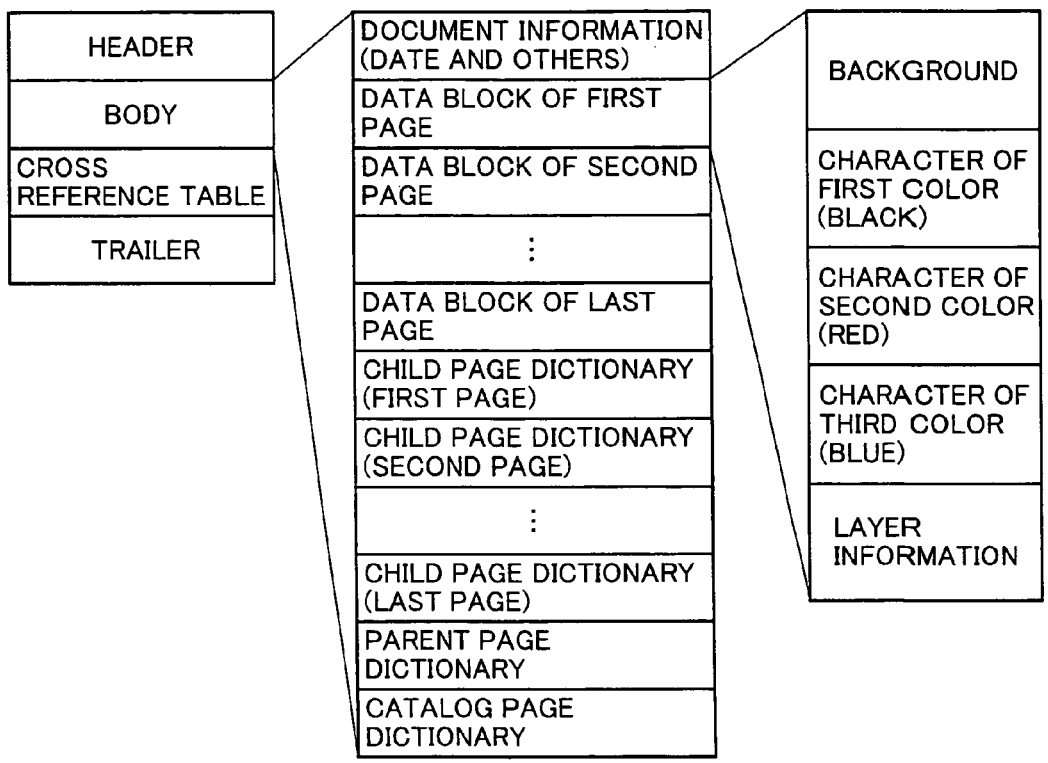
FIG. 17 shows a specific example of a data configuration of a compact PDF file.
Figure 18:
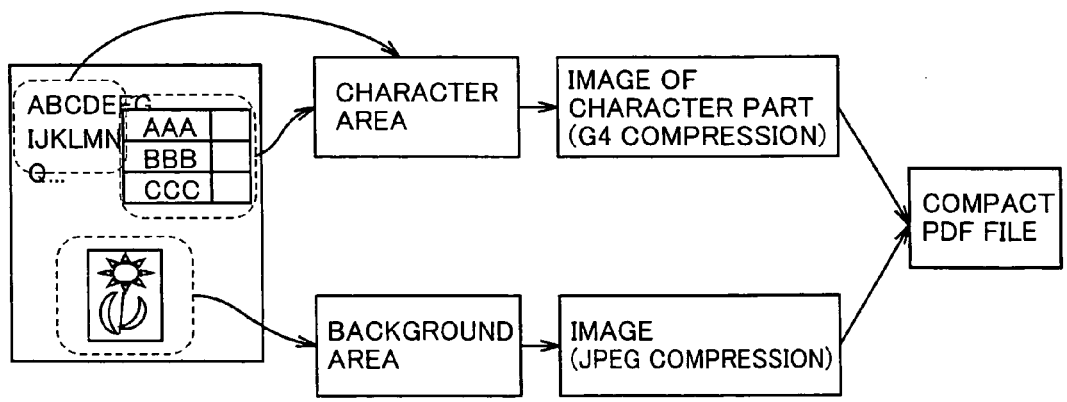
FIG. 18 illustrates how a compact PDF file is created.

Next, for the rectangular area obtained by the labeling above, determination is made as to whether the rectangular area is a character part or not (step S503). More specifically, a feature vector is calculated based on the lateral width and height of the rectangular area, the proportion of the black pixels in the rectangular area, and the proportion of the black pixels in each of further divided areas of the relevant rectangular area (divided, e.g., into five areas in each of the lateral and longitudinal directions). The feature vector thus calculated is used to determine whether the rectangular area is a character part or not. For example, when the target area is the rectangular area shown in FIG. 16, the lateral width (A), the height (B), the proportion (C) of the black pixels in the entire rectangular area, and the proportion (D) of the black pixels in each of the small areas when the rectangular area is divided, e.g., into 25 areas with five areas in each of the lateral and longitudinal directions, as shown in FIG. 16, are employed to determine whether the relevant rectangular area is a character part or not.

The factors to be taken into consideration when calculating the feature vector are not limited to the four factors described above. Another factor may be added, or at least one factor among them may be employed. As an example of such determination, dictionary data describing feature vectors taking account of the above-described factors for each character may be recorded (or created) in advance, and the calculated feature vector may be compared with the dictionary data to determine whether the rectangular area is a character part or not. Further, upon character determination described above, the discrimination results obtained in step S107 above, which indicate whether each of the graphic blocks is a small area including a character part or a small area including another item (photograph or the like), may be employed, and the character determination may be made for the graphic block discriminated as the small area including a character part.

Next, in steps S127-S131, binarization processing of characters in the document is carried out. More specifically, in step S127, processing of removal of dots from the rectangular area determined to be a character part in the character determination processing in step S123 or S125 above is carried out. With this dot removal processing, dots included in the background of the character are removed, which prevents a dot from being binarized as a character.

Next, in step S129, binarization processing is performed on the rectangular area, which is a character part with the dots removed therefrom, thereby separating the character and the background in the rectangular area. This binarization of the character part reduces the size of the image data.

Then, in step S131, the color of the character is determined by referring to the color data (RGB data) of the original image corresponding to the character part. The determination of the color of the character in step S131 is performed for each rectangular area that was determined to be a character part in step S123 or S125 above, and one color is allocated to one character part. If the distance between the neighboring two rectangular areas determined to be the character parts is equal to or less than a prescribed distance, and if the difference of the colors allocated to the rectangular areas is equal to or less than a prescribed value, then the two rectangular areas may be integrated. This integration can reduce the number of rectangular areas, which are character parts, and the size of the PDF data created can be reduced. In addition, the PDF data can be created more quickly.

The area discrimination processing in step S3 above for creating a compact PDF data is thus completed.

As described above, in the area discrimination processing according to the present embodiment, character determination processing is carried out separately for the text area and the graphic area included in the document. For the text area, character determination is performed in a unit of rectangular area in which black pixels are connected with each other, as in the conventional technique. In contrast, for the graphic area, character determination is performed for each rectangular area obtained by labeling, without connecting the black pixels.

Refraining from connecting the black pixels in the graphic area prevents degradation in accuracy of character determination, since lines or points that are likely to exist in great numbers in the vicinity of characters in the graphic area are prevented from being connected with the pixels constituting the characters. As a result, the character part in the graphic area can be determined with high precision. Further, separating the graphic area from the text area enables conventional character determination to be performed on the text area, which guarantees the favorable processing speed.

According to this embodiment, the present invention is used for the character determination processing that is image processing preceding creation of a PDF file. The present invention however is not limited thereto, but can be used for character determination processing for preventing erroneous character recognition that is performed before character recognition processing as in an optical character reader (OCR) or the like.

Further, it is possible to provide a character determination program for causing a computer to perform the character determination processing that is executed by the MFP 10 of the present embodiment. Such a program can be stored in a computer-readable recording medium, such as a flexible disk attached to a computer, a compact disk read only memory (CD-ROM), a read only memory (ROM), a random access memory (RAM) or a memory card, and provided as a program product. Alternatively, the program can be recorded in a recording medium, such as a hard disk incorporated in a computer. Alternatively, the program can be provided by download through a network.

The character determination program according to the present invention may invoke required ones of program modules provided as part of the operation system (OS) of a computer at a predetermined sequence at a predetermined timing to make the modules execute the processing. In this case, the program itself does not contain the modules described above and cooperates with the OS to execute the processing. Such a program that contains no modules may also be included in the character determination program according to the present invention.

The program product provided is installed in a program storage unit, such as a hard disk, for execution. Here, it is to be noted that the program product includes a program itself and a storage medium in which the program is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
an image data obtaining unit obtaining image data;
a discrimination unit separating in the image data a first area comprising characters without graphics from a second area comprising graphics with characters and using different methods to determine the characters based on whether the characters exist in the first area or the second area;
a first character determining unit performing character determination processing with a first character determination method on the first area comprising characters without graphics that has been separated from the second area comprising graphics with characters; and
a second character determining unit performing character determination processing with a second character determination method on the second area comprising graphics with characters that has been separated from the first area comprising characters without graphics.

2. The image processing apparatus according to claim 1, wherein
said second character determining unit includes
a minimum rectangular area obtaining unit obtaining a minimum rectangular area surrounding consecutive pixels by performing labeling on said second area, and
a determining unit determining whether said minimum rectangular area is a character part or not.

3. The image processing apparatus according to claim 2, wherein said pixels are of a particular color.

4. The image processing apparatus according to claim 2, wherein said determining unit determines whether said minimum rectangular area is the character part or not by using a proportion of pixels of said particular color within said minimum rectangular area.

5. The image processing apparatus according to claim 1, wherein
said first character determining unit includes
a connecting unit connecting a first pixel and a second pixel included in said first area,
a minimum rectangular area obtaining unit obtaining a minimum rectangular area surrounding said first and second pixels connected to each other by performing labeling on said first area, and
a determining unit determining whether said minimum rectangular area is a character part or not.

6. The image processing apparatus according to claim 5, wherein
said first character determining unit further includes a line space detecting unit detecting a line space in said first area, and
said connecting unit connects said first and second pixels to each other in said first area other than said line space.

7. The image processing apparatus according to claim 5, wherein said connecting unit connects said first and second pixels to each other when a distance between said first and second pixels is not greater than a prescribed distance.

8. The image processing apparatus according to claim 5, wherein said pixels are of a particular color.

9. The image processing apparatus according to claim 5, wherein said determining unit determines whether said minimum rectangular area is the character part or not by using a proportion of pixels of said particular color in said minimum rectangular area.

10. The image processing apparatus according to claim 1, further comprising:
a first compression unit reversibly compressing a first area determined to be a character part by character determination in said first character determining unit and/or said second character determining unit; and
a second compression unit irreversibly compressing a second area determined to be a non-character part by character determination in said first character determining unit and/or said second character determining unit.

11. The image processing apparatus according to claim 10, wherein said second compression unit includes a processing unit reducing a resolution of said second area.

12. A character determination non-transitory computer readable storage medium for causing a computer to perform character determination processing comprising:
an image data obtaining step of obtaining image data;
discrimination steps of separating in the image data a first area comprising characters without graphics from a second area comprising graphics with characters and using different methods to determine the characters based on whether the characters exist in the first area or the second area;
a first character determining step of performing character determination processing with a first character determination method on the first area comprising characters without graphics that has been separated from the second area comprising graphics with characters; and
a second character determining step of performing character determination processing with a second character determination method on the second area comprising graphics with characters that has been separated from the first area comprising characters without graphics.

13. The character determination non-transitory computer readable storage medium according to claim 12, wherein
said second character determining step includes
a minimum rectangular area obtaining step of obtaining a minimum rectangular area surrounding consecutive pixels by performing labeling on said second area, and
a determining step of determining whether said minimum rectangular area is a character part or not.

14. The character determination non-transitory computer readable storage medium according to claim 12, wherein said first character determining step includes
a connecting step of connecting a first pixel and a second pixel included in said first area,
a minimum rectangular area obtaining step of obtaining a minimum rectangular area surrounding said first and second pixels connected to each other by performing labeling on said first area, and
a determining step of determining whether said minimum rectangular area is a character part or not.

15. The character determination non-transitory computer readable storage medium according to claim 12, wherein said character determination processing further comprises:
a first compression step of reversibly compressing a first area determined to be a character part by character determination in said first character determining step and/or said second character determining step; and
a second compression step of irreversibly compressing a second area determined to be a non-character part by character determination in said first character determining step and/or said second character determining step.

16. A character determination method for determining a character included in image data in an image processing apparatus, the method comprising:
an image data obtaining step of obtaining image data;
discrimination steps of separating in the image data a first area comprising characters without graphics from a second area comprising graphics with characters and using different methods to determine the characters based on whether the characters exist in the first area or the second area;
a first character determining step of performing character determination processing with a first character determination method on the first area comprising characters without graphics that has been separated from the second area comprising graphics with characters; and
a second character determining step of performing character determination processing with a second character determination method on the second area comprising graphics with characters that has been separated from the first area comprising characters without graphics.

17. The character determination method according to claim 16, wherein
said second character determining step includes
a minimum rectangular area obtaining step of obtaining a minimum rectangular area surrounding consecutive pixels by performing labeling on said second area, and
a determining step of determining whether said minimum rectangular area is a character part or not.

18. The character determination method according to claim 16, wherein said first character determining step includes
a connecting step of connecting a first pixel and a second pixel included in said first area,
a minimum rectangular area obtaining step of obtaining a minimum rectangular area surrounding said first and second pixels connected to each other by performing labeling on said first area, and
a determining step of determining whether said minimum rectangular area is a character part or not.

19. The character determination method according to claim 16, further comprising:
a first compression step of reversibly compressing a first area determined to be a character part by character determination in said first character determining step and/or said second character determining step; and
a second compression step of irreversibly compressing a second area determined to be a non-character part by character determination in said first character determining step and/or said second character determining step.

* * * * *